United States Patent [19]
Matsumura

[11] Patent Number: 6,028,746
[45] Date of Patent: Feb. 22, 2000

[54] ACTUATOR LOCKING MECHANISM AND LOCKING METHOD

[75] Inventor: Yoshizumi Matsumura, Ayase, Japan

[73] Assignee: International Business Machines Corporation, Armonk, N.Y.

[21] Appl. No.: 09/079,920

[22] Filed: May 15, 1998

[30] Foreign Application Priority Data

Jun. 26, 1997 [JP] Japan .................................. 9-169997

[51] Int. Cl.[7] .............................. G11B 5/24; G11B 21/22
[52] U.S. Cl. ......................................................... 360/105
[58] Field of Search ............................... 360/97.01, 105, 360/106

[56] References Cited

U.S. PATENT DOCUMENTS

| 5,404,257 | 4/1995 | Alt ......................................... 360/105 |
| 5,528,437 | 6/1996 | Mastache ................................. 360/105 |
| 5,742,455 | 4/1998 | Boutaghou ............................... 360/105 |
| 5,812,345 | 9/1998 | MacPherson et al. .................. 360/105 |
| 5,877,922 | 3/1999 | Boutaghou ............................... 360/105 |

Primary Examiner—William J. Klimowicz
Attorney, Agent, or Firm—Noreen A. Krall

[57] ABSTRACT

The present invention is an actuator locking mechanism used for an information recording apparatus, having a simple structure and a large securing force. A locking mechanism of the present invention comprises an actuator, an attractable member, a support member, a spring, and an inertia member. While the attractable member and the actuator are attracted to each other, the support member rotates correspondingly to the movement of the actuator due to an impact force applied to an information recording apparatus, the spring provides elasticity for the support member while elastically deforming, moreover the inertia member is rotated by the impact force, and a securing portion of the inertia member contacts the actuator to limit the movement of the actuator due to the impact force.

3 Claims, 4 Drawing Sheets

ACTUATOR LOCKING MECHANISM AND LOCKING METHOD

BACKGROUND OF THE INVENTION

1. Field of the Invention

The present invention is directed to an actuator locking mechanism of an information recording apparatus, and more particularly to a locking mechanism and a locking method for securing an actuator against an impact force applied from the outside by using an inertia member to be operated by the impact force.

2. Description of Related Art

In the case of an information recording apparatus such as a magnetic disk drive, a read/write transducer is provided for an actuator and the actuator is driven so that the transducer scans a recording medium. An actuator locking mechanism is used so that the transducer is moved to the outside of the recording region of the recording medium, that is, the stop position of the actuator when reading or writing is not performed. The actuator locking mechanism prevents the transducer from being moved into the recording region even if an impact force is applied to the magnetic disk drive from outside the unit while the actuator is resting at the stop position.

The fixed-magnet-type locking mechanism disclosed in Japanese Patent Unexamined Publication No. 151737/1993 is one example of the actuator locking mechanisms found in the art. The fixed-magnet-type locking mechanism is characterized by a simple structure which is easily decreased in size because the actuator is secured by attracting a part of the actuator resting at the stop position with a permanent magnet secured to the base of a magnetic disk unit. However, because the increase of a magnetic attraction force is limited, the actuator cannot be secured to the base against a large impact force applied to the actuator since magnetic attraction is disabled. Particularly, the requests for downsizing and portability of personal computers having a magnetic disk drive also require further downsizing of the magnetic disk drive, thereby limiting the increase of a magnet size in order to improve the securing force of the locking mechanism. The magnitude of an impact force applied to the magnetic disk drive in the personal computer is increased as the units become more portable, and accelerate the problem that the actuator cannot completely be secured at its stop position.

The solenoid-type locking mechanism provided with a solenoid and a mechanical latching mechanism is another locking mechanism disclosed in Japanese Patent Unexamined Publication No. 151737/1993. The solenoid-type locking mechanism makes it possible to obtain a large actuator securing force. However, because the structure is complicated and increased in size compared to the magnet type, it is not very suitable as the actuator locking mechanism of the magnetic disk drive for which downsizing and portability are requested.

As described above, a conventional actuator locking mechanism has a problem that it cannot show a large securing force as it is decreased in size. Accordingly, it can be seen that there is a need to provide an actuator locking mechanism having a simple structure like the magnet type and a securing force not limited by the attraction force of a magnet.

SUMMARY OF THE INVENTION

To overcome the shortcomings of the prior art described above, it is the object of the invention to provide an actuator locking mechanism having a simple structure like the magnet type locking mechanism and a securing force that is not limited by the attraction force of a magnet.

Briefly stated, the present invention is an actuator locking mechanism comprising an inertia member which can be operated by an impact force. The inertia member is resting at a reference position while no impact force is applied. However, when an impact force is applied externally to an information recording apparatus, the inertia member is moved by the impact force up to a position for limiting the movement of the actuator and hits the actuator to limit the movement of the actuator resulting from the impact force.

An actuator locking mechanism according to the present invention is provided with an inertia member which is operated by an impact force applied to an information recording apparatus and hits an actuator to limit the movement of the actuator due to the impact force. The inertia member operates only when an impact force is applied and engages with the actuator. It is not directly related to the principle of the present invention whether the actuator is secured to the stop position by some other locking mechanism before an impact force is applied. When combining the actuator locking mechanism of the present invention with another locking mechanism found in the art, it is possible to secure the actuator to the stop position by the inertia member of the present invention when a large impact force is applied which would otherwise disable the other locking mechanism.

The actuator locking mechanism of the present invention further has means for returning the inertia member to the reference position from the position where the member contacts the actuator. After the impact force is lost, the actuator locking mechanism cancels the limitation of movement of the actuator, allows the actuator to be freely driven by an actuator motor, and prepares for the next impact force. To return the inertia member to the reference position, it is possible to not only add means different from the inertia member but also use a structure of the inertia member which makes the inertia member return to the reference position by itself in accordance with a repulsion due to the contact of the inertia member with the actuator.

Furthermore, the locking mechanism of the present invention has means for limiting the operation of an inertia member while an actuator performs read or write operation. The limiting means prevents a positioning error from occurring when the inertia member operates due to the vibration caused by the operation of the actuator on a data track nearby the stop position and thereby hits the actuator.

The locking mechanism of the present invention secures the actuator at the stop position by combining an attractable member and the inertia member. The attractable member can be attracted to a part of the actuator so as to secure the actuator to a base when the actuator is driven to move a slider to a non-recording region of a recording medium and the inertia member secures the actuator when a large impact force is applied which the attractable member cannot withstand.

The locking mechanism in accordance with the present invention comprises an actuator, an attractable member which can be attracted to a part of the actuator, a support member mounting an attractable member and rotatably set to a base, a spring engaged with the support member to provide an elasticity for the support member in the direction in which the attractable member separates from the part of the actuator, and an inertia member, having a securing portion, being operated by an impact force applied to an information recording apparatus rotatably being set to a base nearby the support member to hit the securing portion against the actuator. According to the above structure, the support member rotates correspondingly to the movement of the actuator due to the impact force applied to the information recording apparatus as the attractable member and the actuator are attracted each other, the spring supplies an elasticity to the support member as elastically deforming, the inertia member is rotated due to the impact force, and the securing portion hits the actuator to limit the movement of the actuator due to the impact force.

The locking mechanism according to the present invention is further provided with a spring as means for returning the inertia member to a reference position. The spring returns the inertia member to the reference position by supplying an elasticity to the inertia member in the direction opposite to the rotational direction of the inertia member due to an impact force when no impact force is applied.

The locking mechanism of the present invention further includes a support member having an engagement portion. The engagement portion secures the inertia member from rotating while no impact force is applied, and releases the inertia member for rotation when an impact force is applied.

An information recording apparatus according to the present invention includes a recording medium, an actuator, and a locking mechanism of the present invention.

DETAILED DESCRIPTION OF THE PREFERRED EMBODIMENT

This invention is described in a preferred embodiment in the following detailed description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
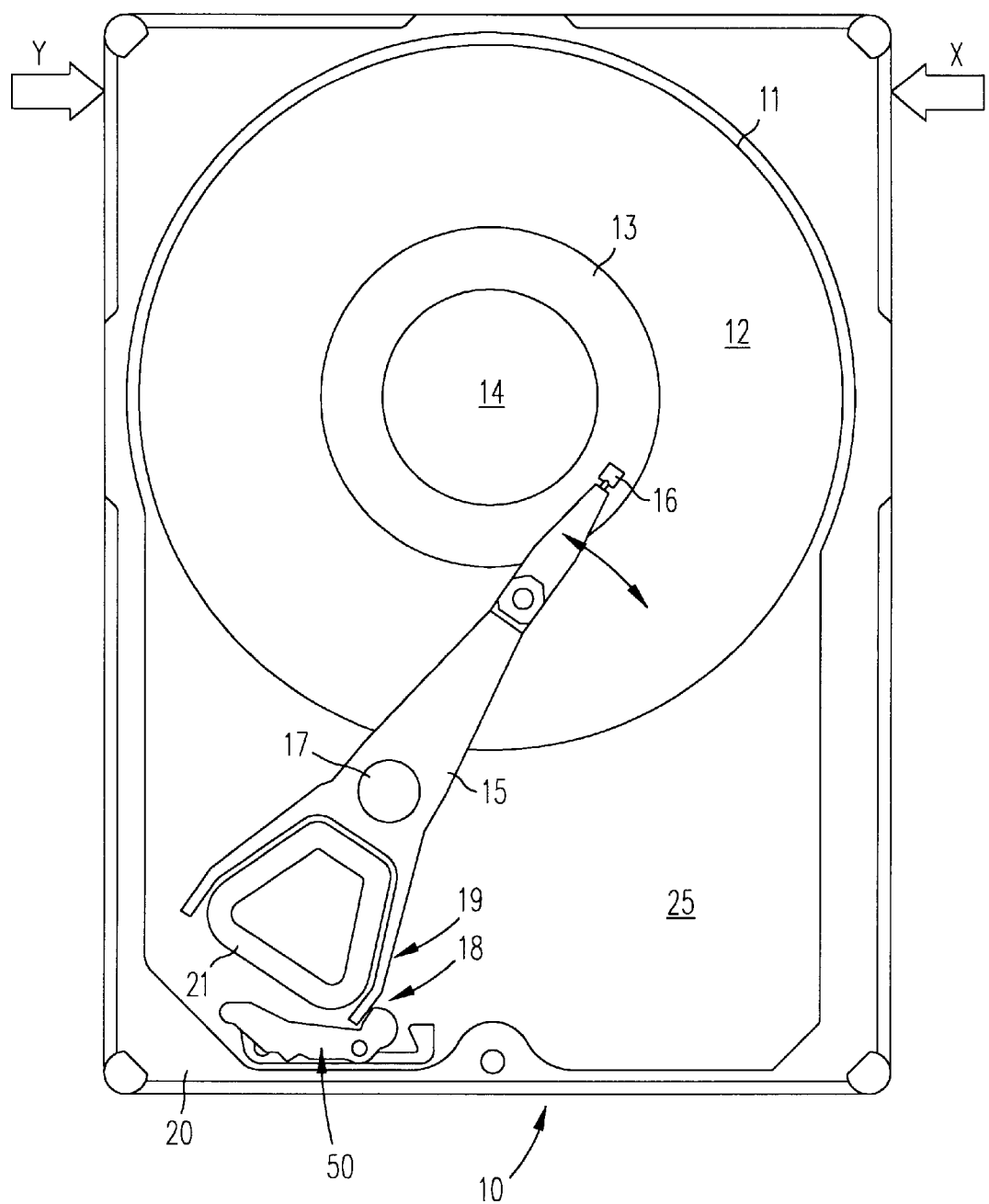
FIG. 1 is a schematic view showing an information recording apparatus including an actuator locking assembly of the present invention.

FIG. 1 is a schematic top view showing the actuator locking mechanism of the present invention in a 3.5" magnetic-disk unit 10. A magnetic disk 11 serving as an information recording medium incudes a recording region 12 used to store information and a non-recording region 13 to which a transducer (not illustrated) is positioned while read or write operation is stopped. The magnetic disk 11 is secured to a spindle shaft 14 and rotated by a spindle motor (not illustrated) while information is read or written. A slider 16 is set to the front end of an actuator 15 through a flexible member and the transducer for reading or writing information from or to the magnetic disk 11 is mounted on the slider 16. While information is read from or written to the recording region 12, the actuator 15 rotates about a shaft 17 over the surface of the rotating recording region 12 and the transducer scans the surface of the recording region 12. In this case, an air flow produced between the surface of the rotating magnetic disk 11 and the surface of the slider 16 facing the disk 11 provides a levitating force for the slider 16. This air flow keeps the slider 16 and the transducer a certain distance from the surface of the magnetic disk 11.

To stop read or write operation, the actuator 15 is moved to a stop position where the slider 16 is positioned over the non-recording region 13. The actuator 15 is driven so that the slider 16 moves to the non-recording region 13. The rotation of the magnetic disk 11 is stopped after the slider is securely positioned over the non-recording region 13. The surface of the non-recording region 13 is coated with a texture for reducing the frictional force between the surface and the slider 16. The texture reduces the frictional force with the slider 16 so that the magnetic disk 11 can be rotated as the slider 16 contacts the texture surface and also has a high-enough friction resistance capable of withstanding the contact with the slider 16 for a long time. Therefore, it is necessary for the actuator 15 be driven so that the slider 16 mounting the transducer moves to the non-recording region 13 immediately before the rotation of the magnetic disk 11 is stopped and the actuator 15 must maintain its position in the non-recording region 13 until the magnetic disk 11 rotates next time.

If any external force works on the actuator 15 at the stop position causing the slider 16 to move to the recording region 12 while the rotation of the magnetic disk 11 is stopped, it is difficult to move the slider 16 to the non-recording region 13 by driving the actuator 15 to overcome the frictional force between the slider 16 and the recording region 12. Moreover, the spindle motor may not be rotated because of a large frictional force between the slider 16 and the recording region 12 or the slider 16 may damage the surface of the recording region 12 if the spindle motor can be rotated. Therefore, it is necessary that the actuator 15 be secured to the base 25 of the unit 10 so that the slider 16 is kept in the range of the non-recording region 13 while the rotation of the magnetic disk 11 is stopped. An actuator locking mechanism is used to secure an actuator 15 to a predetermined position in the non-recording region 13.

Figure 2:
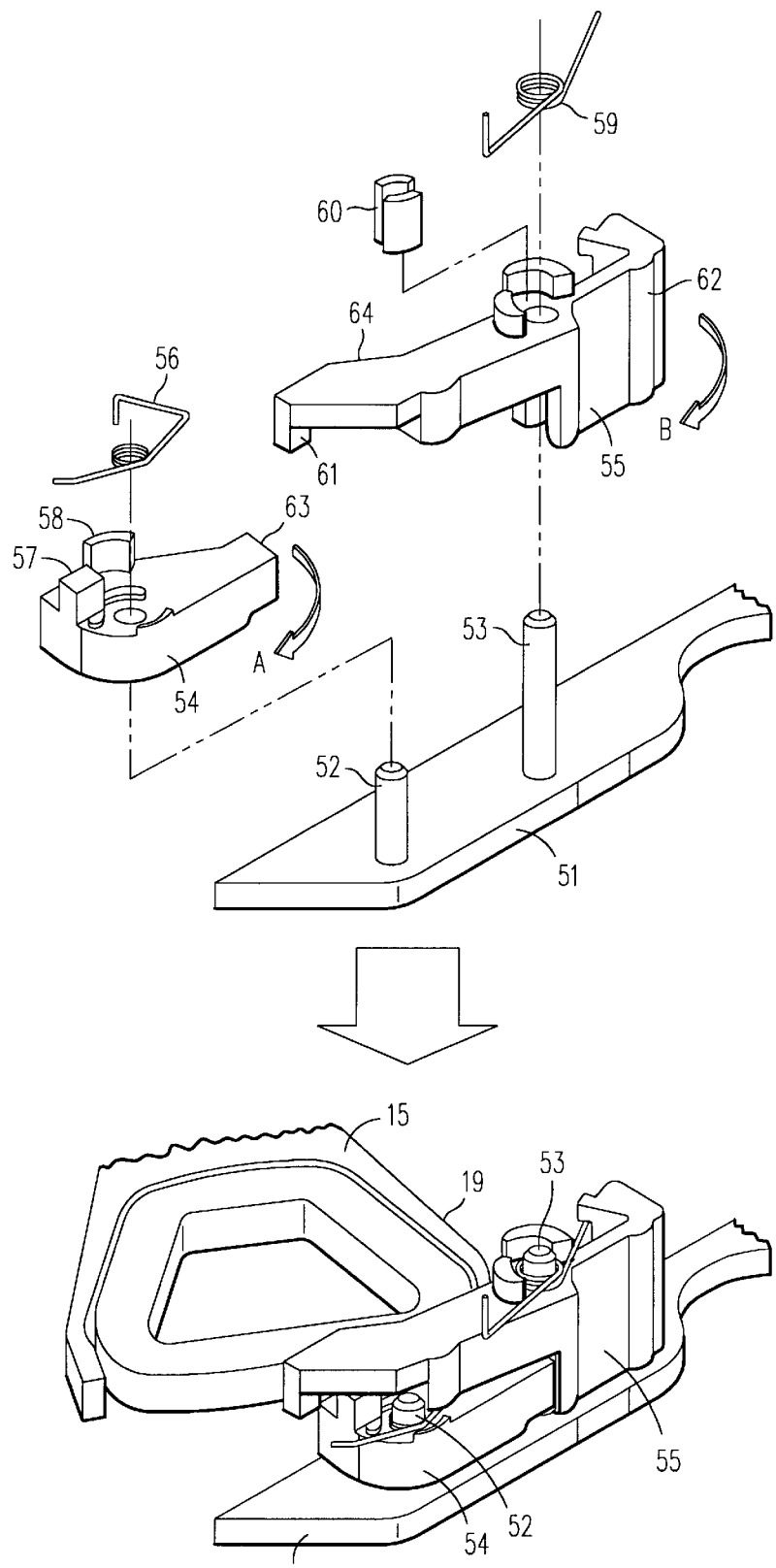
FIG. 2 is an exploded assembly diagram of an actuator locking assembly according to the present invention.

In FIG. 1, the actuator 15 is shown at the stop position and the slider 16 is positioned over the non-recording region 13. An iron piece 18 is set to an arm portion 19 occupying the rear of the actuator 15 and an actuator locking assembly 50 secures the actuator 15 to the base 25 by attracting the iron piece 18 with a magnet. FIG. 2 is an exploded assembly diagram of the actuator locking assembly 50. Shafts 52 and 53 protrude from a base 51, an inertia member 54 is rotatably set to the shaft 52, and a magnet support member 55 is rotatably set to the shaft 53 so as to cover the inertia member 54. The inertia member 54 is provided with protrusions 57 and 58 and a compression coil spring 56 is set to the shaft 52 so as to provide a small elasticity for the inertia member 54 in the direction shown by the arrow A. The magnet support member 55 mounts a magnet assembly 60 and has a protrusion 61 and the compression coil spring 59 is set to the shaft 53 so as to provide an elasticity for the support member 55 in the direction shown by the arrow B.

Figure 3A:
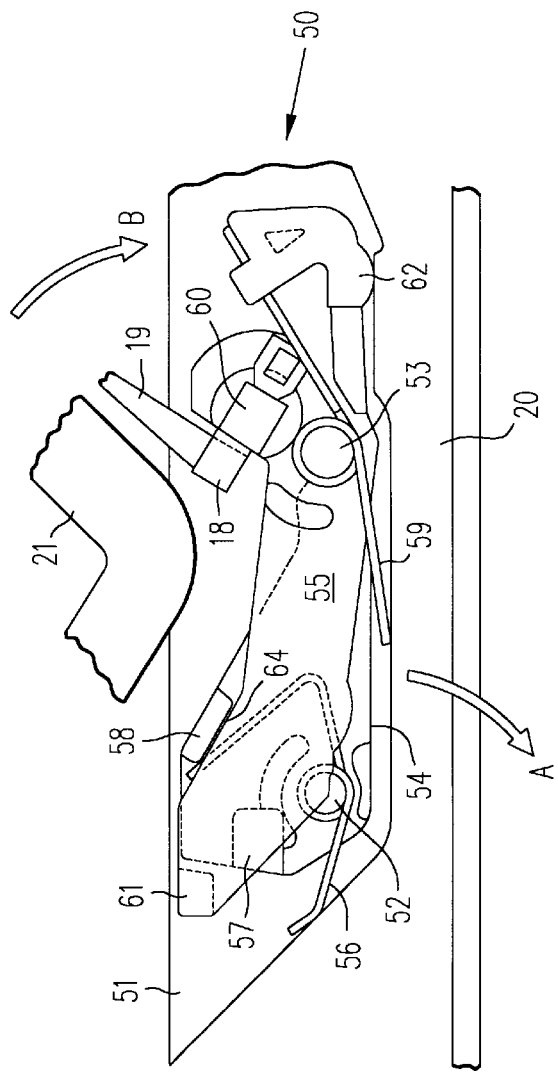
FIGS. 3(a) to 3(d) are illustrations showing the operation states of an actuator locking assembly according to the present invention.

Operation of this embodiment are described with reference to FIGS. 3(a) to 3(d). FIG. 3(a) shows a state in which the actuator 15 present at the stop position is secured to the base 51 by the actuator locking assembly 50. The support member 55 rotates in accordance with an elasticity provided by the spring 59 and stops at a position where a portion 62 contacts a wall 20 of a housing. By operating a spindle motor (not illustrated) to drive the actuator 15 up to the stop position, the iron piece 18 and the magnet of the magnet assembly 60 are attracted each other. Therefore, even if the spindle motor is stopped under the above state and movement of the actuator 15 due to an impact force is started, the movement of the actuator 15 is limited because an elasticity in the direction of the arrow B is provided by the spring 59 through the iron piece 18.

In this case, the impact force applied to the magnetic disk unit 10 is defined as a force working on the magnetic disk unit 10 when rotating the unit 10 about the actuator shaft 17 to make the unit 10 collide with an object at X in FIG. 1. In accordance with the impact force in this direction, the actuator 15 resting at the stop position moves so that the slider 16 is bound for the recording region 12. The actuator locking assembly 50 of this embodiment limits the movement of the actuator 15. Moreover, according to the impact force when rotating the magnetic disk unit 10 so as to make the unit 10 collide with an object at Y in FIG. 1, the actuator 15 moves in the direction in which the slider 16 is bound for the spindle shaft 14 and therefore, the slider 16 does not move toward the recording region 12 even if the locking mechanism does not function.

At the point of time of FIG. 3(a), the inertia member 54 is present at the reference position and therefore, it does not contribute to the securing of the actuator 15. The inertia member 54 is rotated by an elasticity provided by the spring 56 and stopped at a position where a part of the inertia member 54 contacts the wall 20 of the housing. The protrusion 58 of the inertia member 54 contacts a portion 64 of the support member 55 and thereby, its rotation in the direction opposite to the arrow A is limited. This limitation has an advantage of preventing accurate positioning of the actuator 15 from being interrupted because the elasticity of the spring 56 is selected as a small value and therefore, the inertia member 54 rotates correspondingly to the vibration due to the operation of the actuator 15 and contacts the actuator 15 when the actuator 15 is driven for read or write operation on a track nearby the stop position.

Figure 3B:
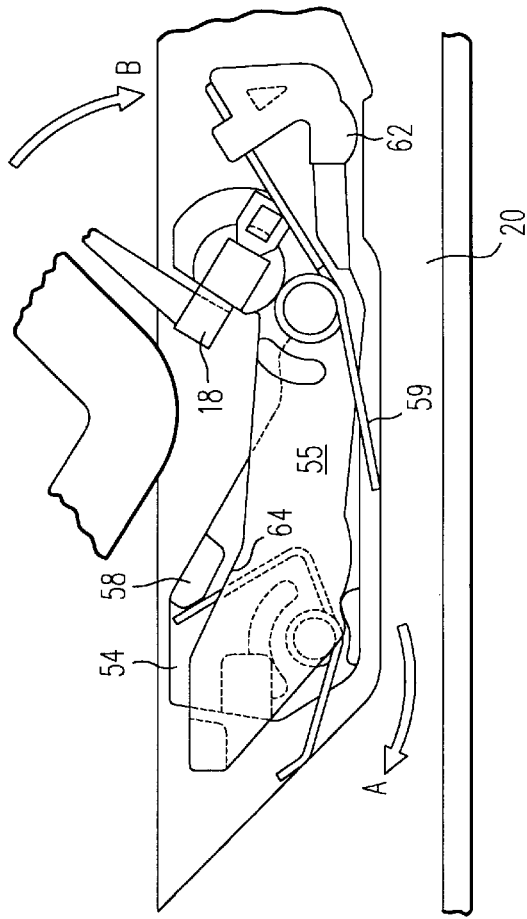
Figure 3C:
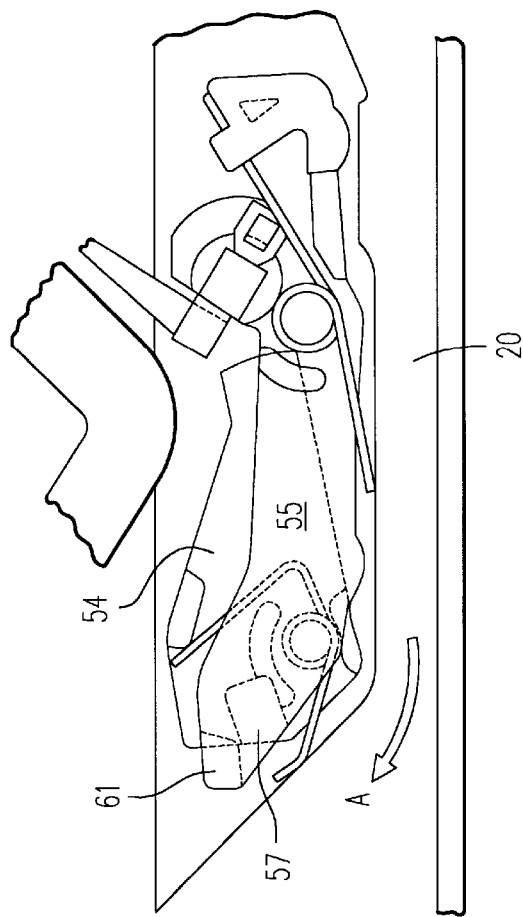

FIG. 3(b) shows the initial state when the impact force due to the collision at X in FIG. 1 is applied under the state of FIG. 3(a). The actuator 15 rotates due to the impact force about the shaft 17 in FIG. 1 in the direction in which the iron piece 18 separates from the magnet of the magnet assembly 60. Because the iron piece 18 and the magnet are magnetically attracted each other, the support member 55 is rotated by the torque due to the impact force of the actuator 15 about the shaft 53 slightly in the direction opposite to the arrow B. Therefore, the portion 62 of the support member 55 separates from the wall 20 of the housing, and the protrusion 58 of the inertia member 54 is released from the limitation by the portion 64 of the support member 55 and the support member is brought under a freely rotatable state. When an impact force is relatively small, the impact force is absorbed by the elasticity of the spring 59 and the support member 55 can be returned to the state in FIG. 3(a). However, when the impact force is large, the support member 55 is further rotated as shown in FIG. 3(c) as a force is applied in the direction of separating the magnet from the iron piece 18. The inertia member 54, which can be freely rotated in the direction opposite to the arrow A, is rotated by an impact force in the direction opposite to the arrow A against the elasticity of the spring 56 simultaneously with the rotation of the support member 55.

Figure 3D:
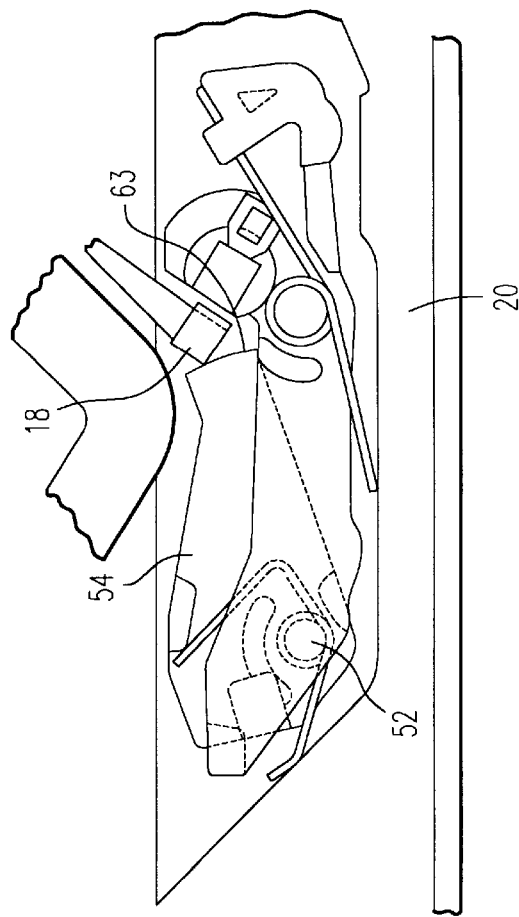

When the attraction of a magnet cannot withstand an impact force because it is too large, the iron piece 18 separates from the magnet and the actuator 15 rotates in the direction in which the slider 16 is bound for the recording region 12. In this case, the inertia member 54 is rotated due to the impact force up to a position where a securing portion 63 of the inertia member 54 can contact the iron piece 18 as shown in FIG. 3(d), and therefore brought into contact with the iron piece 18 of the actuator 15 separated from the magnet to limit further movement of the actuator 15 due to the impact force. When the iron piece 18 contacts the securing portion 63 of the inertia member 54 under the state in FIG. 3(d), the iron piece 18 gives a force to the inertia member 54 in the direction bound for the shaft 52 from the contact position between the iron piece 18 and the inertia member 54. At the moment when the iron piece 18 contacts the securing portion 63, a reactive force large enough to interrupt the rotation of the actuator due to an impact force is provided for the iron piece 18 due to the reaction of the force in the direction bound for the shaft 52 and the actuator 15 rotates due to the reaction in the direction in which the iron piece 18 approaches the magnet and returns to the initial state. In the case of the structure of this embodiment, after the iron piece 18 contacts the securing portion 63, the inertia member 54 is not further rotated in the direction opposite to the arrow A by the rotation of the actuator 15 due to an impact force. However, it is also possible to limit the rotation of the inertia member 54 in the direction opposite to the arrow A by contacting a part of the inertia member 54 with the wall 20 of the housing after the contact of the iron piece 18 and the securing portion 63. After the iron piece 18 contacts the securing portion 63, the inertia member 54 is returned to the reference position due to the reaction of the force provided by the iron piece 18 and the spring 56 works so as to support the return of the member 54. Moreover, it was confirmed through a test on this embodiment that the inertia member 54 returns to the reference position even if the spring 56 is not used.

In this embodiment, the protrusions 61 and 57 are engaged with each other under the state in FIG. 3(c) and the inertia member 54 is limited by the spring 56 so that it does not rotate in the direction of the arrow A. It is possible to eliminate the engagement between the protrusions 61 and 57 because the state in FIG. 3(d) is set before the inertia member 54 returns to the reference position by properly selecting an operation characteristic of the inertia member 54 to an impact force. In this embodiment, the securing portion 63 of the inertia member 54 operates so as to contact the iron piece 18 after the iron piece 18 separates from the magnet. However, it is also possible to bring the securing portion 63 into contact with the iron piece 18 before the iron piece 18 separates from the magnet. Furthermore, the actuator is herein described as the rotary type. However, the principle of the present invention is not restricted to a rotary actuator but it can be also applied to a linear actuator.

In the embodiment described herein, the inertia member 54 is combined with the magnet support member 55 mounting a magnet. However, the magnet support member 55 of this embodiment only functions so as to control the operation of the inertia member 54 and it is possible to use any other methods for controlling the inertia member 54. That is, it is possible to use any means for controlling the inertia member 54 so that it is not operated by the vibration due to the normal operation of the actuator 15 when it is present at the reference position but making it possible for the inertia member 54 to freely operate when an impact force is applied. It is necessary that the inertia member 54 of this embodiment moves up to a position for limiting the movement of the actuator 15 before the actuator 15 moves when an impact force is applied. Because the inertia member 54 is operated by an impact force, it is necessary to select the weight, moment of inertia, and center-of-gravity position as its working characteristics. The inertia member 54 used for this embodiment is made of polycarbonate and its weight is set to 0.446 g, its moment of inertia is set to 2.585 g.mm², and its center of gravity is set to a position 4.032 mm apart from the center of the shaft 52. The spring 56 is constituted by winding a steel wire of SUS 316 with a diameter of 0.15 mm up to four turns so that the diameter of the coil portion comes to 3.7 mm and setting the length of one arm to 8.5 mm from the center of the coil portion and the length of the other arm to a total of 10 mm, that is, 5 mm each at the both sides of the curved portion. Moreover, the elasticity of a spring 59 is set to a value approximately. 16 times larger than the elasticity of the spring 56.

As described above, the present invention makes it possible to provide an actuator locking mechanism increasing the securing force up to the physical strength of an inertia member. Downsizing of an actuator locking mechanism of the present invention can be realized with a simple structure by operating an inertia member by using an impact force. Moreover, by using a locking mechanism having an inertia member, it is possible to provide an information recording apparatus superior in impact resistance.

While the present invention has been particularly shown and described with reference to the preferred embodiments, it will be understood by those skilled in the art that various changes in form and detail may be made without departing from the spirit, scope and teaching of the present invention. Accordingly, the disclosed invention is to be considered as merely illustrative and limited only as specified in the appended claims.

We claim:

1. An actuator locking mechanism for use with an information recording apparatus to limit the movement of an actuator resting at its stop position due to an impact force, comprising:

an actuator mounting a slider and attached transducer for transferring information to and from a recording medium, said actuator being driven so that the transducer scans the recording medium;

an attractable member being attracted to a part of said actuator when said actuator is driven to move the slider to a non-recording region of the recording medium;

a support member mounting said attractable member and rotatably being to a base;

a spring being engaged with said support member to supply an elasticity for said support member in a direction to which said attractable member separates from the part of said actuator; and an inertia member rotatably being set to the base nearby said support member, said inertia member having a securing portion, said inertia member being operated due to an impact force applied to the information recording apparatus to hit a contact portion against said actuator; wherein said support member further comprising an engaging portion for securing said inertia member so that the inertia member does not rotate while the impact force is not applied and freely rotates said inertia member when the impact force is applied and said support member rotates correspondingly to the movement of said actuator due to the impact force applied to the information recording apparatus as said attractable member and said actuator are attracted each other, said spring provides an elasticity for said support member as it elastically deforms, said inertia member rotates due to the impact force, and the securing portion hits said actuator to limit the movement of said actuator due to said impact force.

2. The actuator locking mechanism according to claim 1, further comprising a spring for returning said inertia member to a reference position by providing an elasticity for said inertia member in a direction opposite to a rotational direction due to the impact force while the impact force is not applied.

3. An information recording apparatus comprising:

an information recording medium;

an actuator mounting a slider and attached transducer for transferring information to and from the information recording medium, said actuator moving the slider to a recording region and non-recording region of said information recording region;

an actuator locking mechanism further comprising an attractable member being attracted to a part of said actuator when said actuator is driven to move the slider to a non-recording region of the recording medium;

a support member mounting said attractable member and rotatably being set to a base;

a spring being engaged with said support member to supply an elasticity for said support member in a direction to which said attractable member separates from the part of said actuator; and an inertia member rotatably being set to the base nearby said support member, said inertia member having a securing portion, said inertia member being operated due to an impact force applied to the information recording apparatus to hit a contact portion against said actuator; wherein said support member further comprising an engaging portion for securing said inertia member so that the inertia member does not rotate while the impact force is not applied and freely rotates said inertia member when the impact force is applied and said support member rotates correspondingly to the movement of said actuator due to the impact force applied to the information recording apparatus as said attractable member and said actuator are attracted each other, said spring provides an elasticity for said support member as it elastically deforms, said inertia member rotates due to the impact force, and the securing portion hits said actuator to limit the movement of said actuator due to said impact force.

* * * * *